United States Patent
Chue et al.

(10) Patent No.: US 7,839,595 B1
(45) Date of Patent: Nov. 23, 2010

(54) FEED FORWARD COMPENSATION FOR FLY HEIGHT CONTROL IN A DISK DRIVE

(75) Inventors: Jack M. Chue, Los Altos, CA (US); Tomas D. Hugunin, Cupertino, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 329 days.

(21) Appl. No.: 12/020,432

(22) Filed: Jan. 25, 2008

(51) Int. Cl.
G11B 21/02 (2006.01)

(52) U.S. Cl. .......................................... 360/75; 360/31

(58) Field of Classification Search ....................... None
See application file for complete search history.

(56) References Cited

U.S. PATENT DOCUMENTS

| | | |
|---|---|---|
| 4,775,902 A | 10/1988 | Trovato et al. |
| 4,777,544 A | 10/1988 | Brown et al. |
| 4,804,894 A | 2/1989 | Machida et al. |
| 4,839,754 A | 6/1989 | Gami et al. |
| 5,130,866 A | 7/1992 | Klaassen et al. |
| 5,168,413 A | 12/1992 | Coker et al. |
| 5,377,058 A | 12/1994 | Good et al. |
| 5,594,595 A | 1/1997 | Zhu |
| 5,742,446 A | 4/1998 | Tian et al. |
| 5,909,330 A | 6/1999 | Carlson et al. |
| 5,949,605 A | 9/1999 | Lee et al. |
| 6,008,640 A | 12/1999 | Tan et al. |
| 6,052,243 A | 4/2000 | Shimada |
| 6,097,559 A | 8/2000 | Ottesen et al. |
| 6,175,456 B1 | 1/2001 | Yun |
| 6,191,901 B1 | 2/2001 | Carlson et al. |
| 6,268,976 B1 | 7/2001 | Carlson et al. |
| 6,288,856 B1 | 9/2001 | Ottesen et al. |
| 6,310,740 B1 | 10/2001 | Dunbar et al. |
| 6,417,981 B1 | 7/2002 | Smith |
| 6,452,735 B1 | 9/2002 | Egan et al. |
| 6,459,539 B1 | 10/2002 | Carlson et al. |
| 6,493,169 B1 | 12/2002 | Ferris et al. |
| 6,501,606 B2 | 12/2002 | Boutaghou et al. |
| 6,519,102 B1 | 2/2003 | Smith et al. |
| 6,608,727 B2 | 8/2003 | Ottesen et al. |
| 6,611,389 B1 | 8/2003 | Liu et al. |
| 6,624,957 B1 | 9/2003 | Yun |
| 6,671,110 B2 | 12/2003 | Baba et al. |
| 6,674,590 B2 | 1/2004 | Ottesen et al. |
| 6,678,108 B2 | 1/2004 | Smith et al. |
| 6,700,724 B2 | 3/2004 | Riddering et al. |
| 6,717,764 B2 | 4/2004 | Lake |
| 6,735,027 B2 | 5/2004 | Helsel et al. |
| 6,762,899 B2 | 7/2004 | Ottesen et al. |

(Continued)

OTHER PUBLICATIONS

Shiramatsu et al., "Dynamically Controlled Thermal Flying-Height Control Slider", IEEE Transactions on Magnetics, vol. 44, Issue 11, Nov. 2008, pp. 3695-3697.

(Continued)

Primary Examiner—Jason C Olson

(57) ABSTRACT

A method of selecting a dynamic fly height (DFH) control setting for a head in a disk drive is disclosed. The head is servoed over a disk, and a fly height measurement is generated for the head. A frequency component is extracted from the fly height measurement, and the DFH control setting for the head is adjusted in response to the extracted frequency component.

23 Claims, 6 Drawing Sheets

U.S. PATENT DOCUMENTS

| | | | |
|---|---|---|---|
| 6,765,745 B2 | 7/2004 | Smith et al. | |
| 6,785,081 B2 | 8/2004 | Chapin et al. | |
| 6,798,605 B2 | 9/2004 | Kurita et al. | |
| 6,801,376 B2 | 10/2004 | Smith | |
| 6,822,816 B2 | 11/2004 | Dakroub | |
| 6,865,040 B2 | 3/2005 | Fayeulle et al. | |
| 6,894,854 B1 | 5/2005 | Carlson et al. | |
| 6,930,844 B2 | 8/2005 | Yeh et al. | |
| 6,980,383 B2 | 12/2005 | Brunnett et al. | |
| 6,992,853 B2 * | 1/2006 | Chang | 360/77.02 |
| 7,016,131 B2 | 3/2006 | Liu et al. | |
| 7,023,647 B2 | 4/2006 | Bloodworth et al. | |
| 7,038,875 B2 | 5/2006 | Lou et al. | |
| 7,046,463 B2 | 5/2006 | Gay Sam et al. | |
| 7,068,449 B2 | 6/2006 | Riddering et al. | |
| 7,068,451 B1 | 6/2006 | Wang et al. | |
| 7,068,457 B2 | 6/2006 | Riddering et al. | |
| 7,092,195 B1 | 8/2006 | Liu et al. | |
| 7,095,578 B2 | 8/2006 | Ma | |
| 7,158,325 B1 | 1/2007 | Hu et al. | |
| 7,180,692 B1 | 2/2007 | Che et al. | |
| 7,215,500 B1 | 5/2007 | Albrecht et al. | |
| 7,253,984 B1 * | 8/2007 | Patapoutian et al. | 360/75 |
| 7,265,933 B1 | 9/2007 | Phan et al. | |
| 7,271,975 B2 | 9/2007 | Shimizu et al. | |
| 7,324,299 B1 | 1/2008 | Schreck et al. | |
| 7,359,138 B1 | 4/2008 | Albrecht et al. | |
| 7,369,340 B1 | 5/2008 | Dang et al. | |
| 7,375,914 B1 | 5/2008 | Dieron et al. | |
| 7,376,182 B2 | 5/2008 | Kris | |
| 7,426,090 B2 | 9/2008 | Yamashita et al. | |
| 7,450,333 B2 | 11/2008 | Hirano et al. | |
| 7,457,072 B2 | 11/2008 | Dieron et al. | |
| 7,583,466 B2 | 9/2009 | Kermiche et al. | |
| 7,605,997 B2 * | 10/2009 | Yamazaki | 360/75 |
| 7,675,707 B1 | 3/2010 | Liu et al. | |
| 2002/0167745 A1 | 11/2002 | Ottesen | |
| 2003/0002183 A1 | 1/2003 | Fioravanti | |
| 2003/0043491 A1 | 3/2003 | Riddering et al. | |
| 2003/0133220 A1 | 7/2003 | Hsin | |
| 2003/0184899 A1 | 10/2003 | Gay Sam et al. | |
| 2003/0184907 A1 | 10/2003 | Li et al. | |
| 2003/0218813 A1 | 11/2003 | Dakroub | |
| 2004/0075940 A1 | 4/2004 | Bajorek et al. | |
| 2005/0030284 A1 | 2/2005 | Braun et al. | |
| 2005/0052415 A1 | 3/2005 | Braun et al. | |
| 2005/0128630 A1 | 6/2005 | Huang et al. | |
| 2006/0146437 A1 | 7/2006 | Khurshudov et al. | |
| 2006/0268445 A1 | 11/2006 | Brannon et al. | |
| 2007/0127148 A1 | 6/2007 | Yokohata et al. | |
| 2007/0211368 A1 * | 9/2007 | Shibano et al. | 360/75 |
| 2007/0268615 A1 * | 11/2007 | McFadyen et al. | 360/75 |
| 2008/0130159 A1 | 6/2008 | Dieron et al. | |
| 2008/0165446 A1 | 7/2008 | Partee | |
| 2008/0239547 A1 | 10/2008 | Okamura | |
| 2009/0141390 A1 | 6/2009 | Oyamada et al. | |
| 2009/0195912 A1 | 8/2009 | Sato | |

OTHER PUBLICATIONS

Notice of Allowance dated Nov. 5, 2009 from U.S. Appl. No. 12/275,989, 19 pages.

* cited by examiner

FEED FORWARD COMPENSATION FOR FLY HEIGHT CONTROL IN A DISK DRIVE

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

Because the disk is rotated at a constant angular velocity, the data rate is typically increased toward the outer diameter tracks (where the surface of the disk is spinning faster) in order to achieve a more constant linear bit density across the radius of the disk. To simplify design considerations, the data tracks are typically banded together into a number of physical zones, wherein the data rate is constant across a zone, and increased from the inner diameter zones to the outer diameter zones. This is illustrated in FIG. 1, which shows a prior art disk format 2 comprising a number of data tracks 4, wherein the data tracks are banded together in this example to form three physical zones from the inner diameter of the disk (ZONE 1) to the outer diameter of the disk (ZONE 3).

The prior art disk format of FIG. 1 also comprises a number of servo sectors $6_0$-$6_N$ recorded around the circumference of each data track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector $6_i$ further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

An air bearing forms between the head and the disk due to the disk rotating at high speeds. Since the quality of the write/read signal depends on the fly height of the head, conventional heads (e.g., a magnetoresistive heads) may comprise a dynamic fly height (DFH) controller, such as a heater which controls the fly height through thermal expansion or a piezoelectric (PZT) actuator. It is therefore desirable to determine the appropriate DFH control setting (e.g., appropriate current applied to the heater or PZT actuator) that achieves the target fly height for the heads.

DETAILED DESCRIPTION OF EMBODIMENTS OF THE INVENTION

Figure 1:
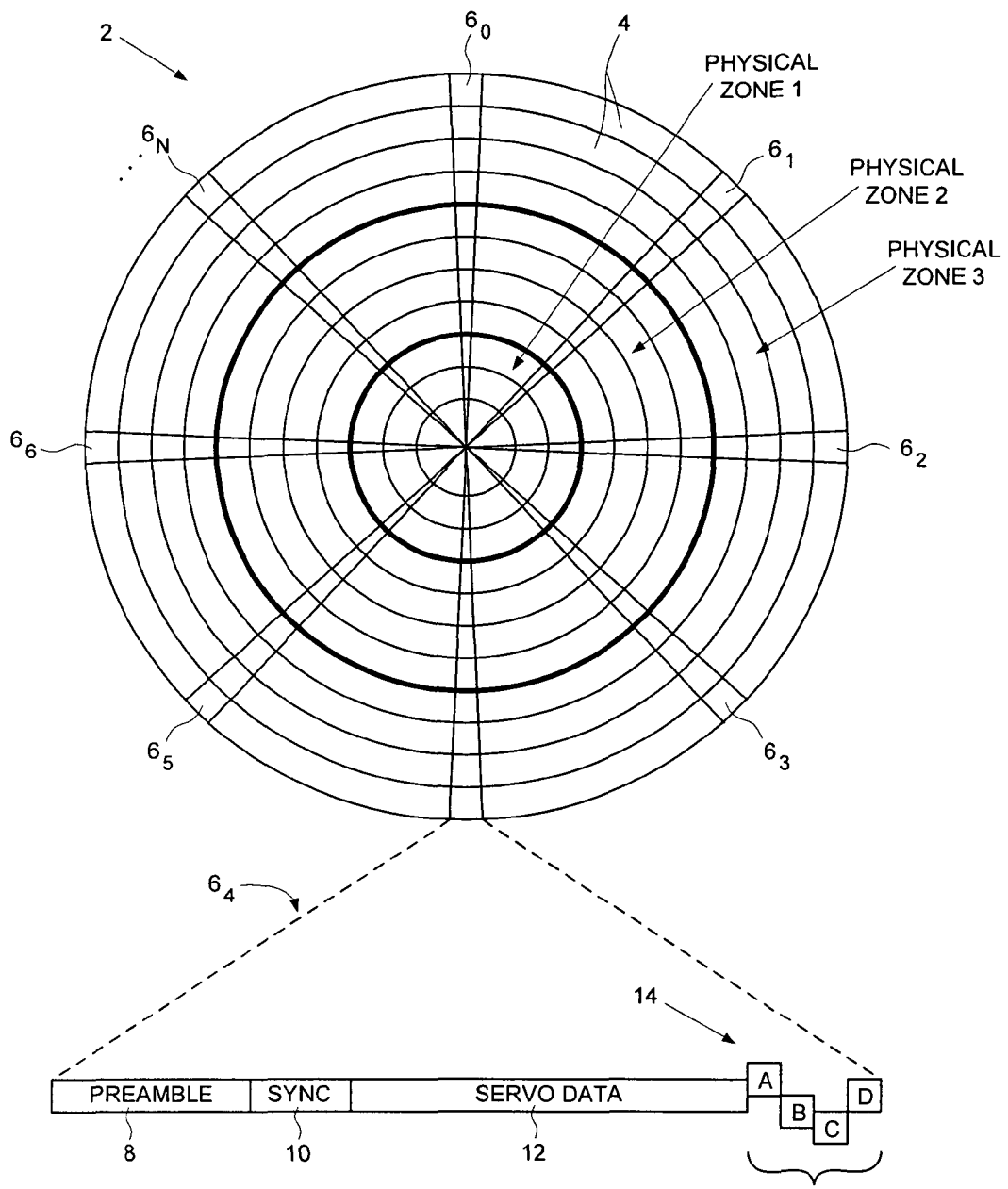
FIG. 1 shows a prior art disk format comprising a plurality of data tracks defined by a plurality of servo sectors.
Figure 2A:
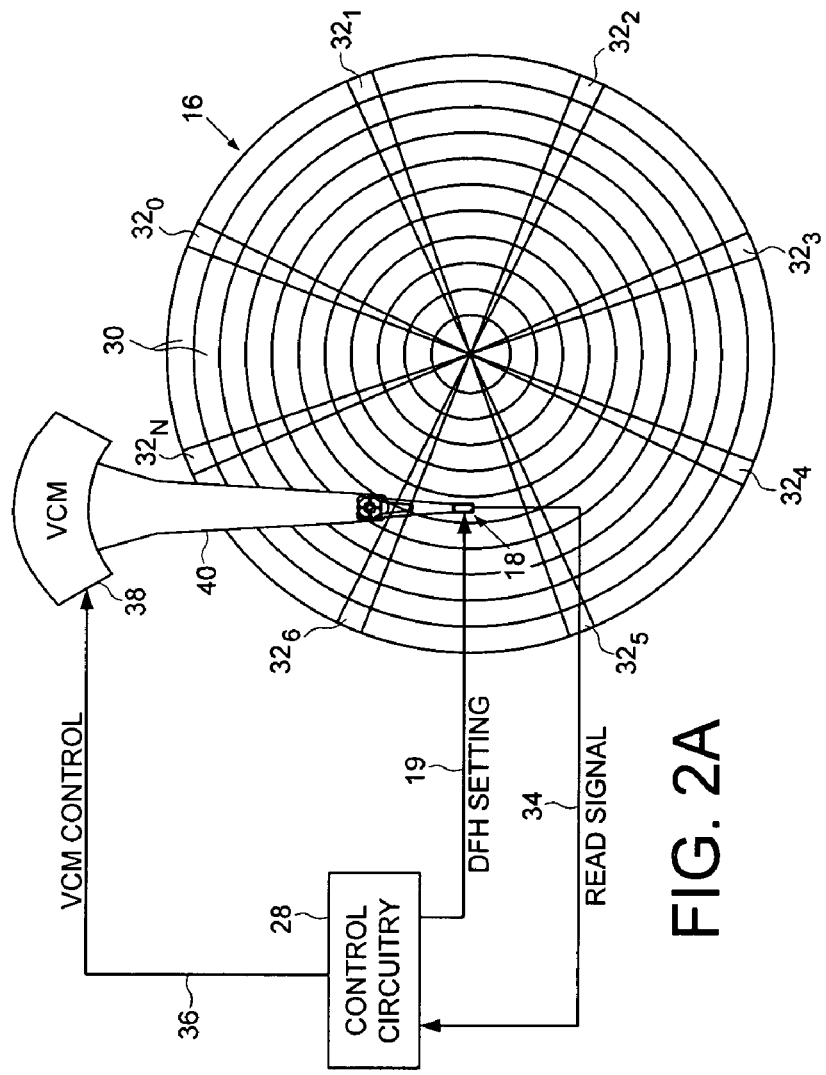
FIG. 2A shows a disk drive according to an embodiment of the present invention comprising a head actuated over the disk, and control circuitry.
Figure 2B:
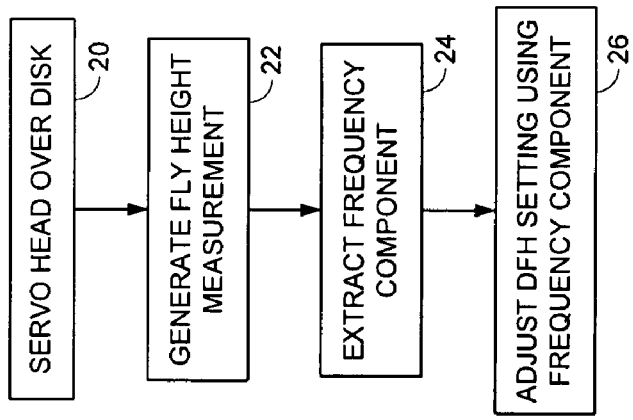
FIG. 2B is a flow diagram according to an embodiment of the present invention wherein a dynamic fly height (DFH) control setting for the head is adjusted in response to a frequency component of a fly height measurement.

FIG. 2A shows a disk drive according to an embodiment of the present invention comprising a disk 16, and a head 18 actuated over the disk 16. A dynamic fly height (DFH) control setting 19 is selected for the head 18 by executing the flow diagram of FIG. 2B. The head is servoed over the disk (step 20), and a fly height measurement is generated for the head (step 22). A frequency component is extracted from the fly height measurement (step 24), and the DFH control setting for the head is adjusted in response to the extracted frequency component (step 26). The flow diagram of FIG. 2B may be implemented in any suitable manner, such as by a test station or servo writer connected to the disk drive, or in another embodiment, by control circuitry 28 within the disk drive.

In the embodiment of FIG. 2A, the disk 16 comprises a plurality of data tracks 30 defined by a plurality of embedded servo sectors $32_0$-$32_N$. The control circuitry 28 processes the read signal 34 emanating from the head 18 to demodulate the servo sectors $32_0$-$32_N$ and generate a position error signal (PES) representing an error between the actual position of the head and a target position relative to a target data track. The control circuitry 28 filters the PES using a suitable compensation filter to generate a control signal 36 applied to a voice coil motor (VCM) 38 which rotates an actuator arm 40 about a pivot in order to actuate the head 18 radially over the disk in a direction that reduces the PES.

Any suitable technique may be employed to measure the fly height for the head 18, such as by evaluating the read signal when reading data from the disk surface, or employing a suitable fly height sensor, such as a suitable capacitive sensor. In addition, the fly height of the head may be adjusted (step 26 of FIG. 2B) using any suitable technique, such as by adjusting a heater which controls the fly height through thermal expansion, or by adjusting a piezoelectric (PZT) actuator integrated with the head which adjusts the fly height mechanically. The DFH control setting 19 may also comprise any suitable signal, such as a linear signal or pulse width modulated signal, and the DFH control setting 19 may adjust any suitable power component, such as current or voltage.

Figure 3A:
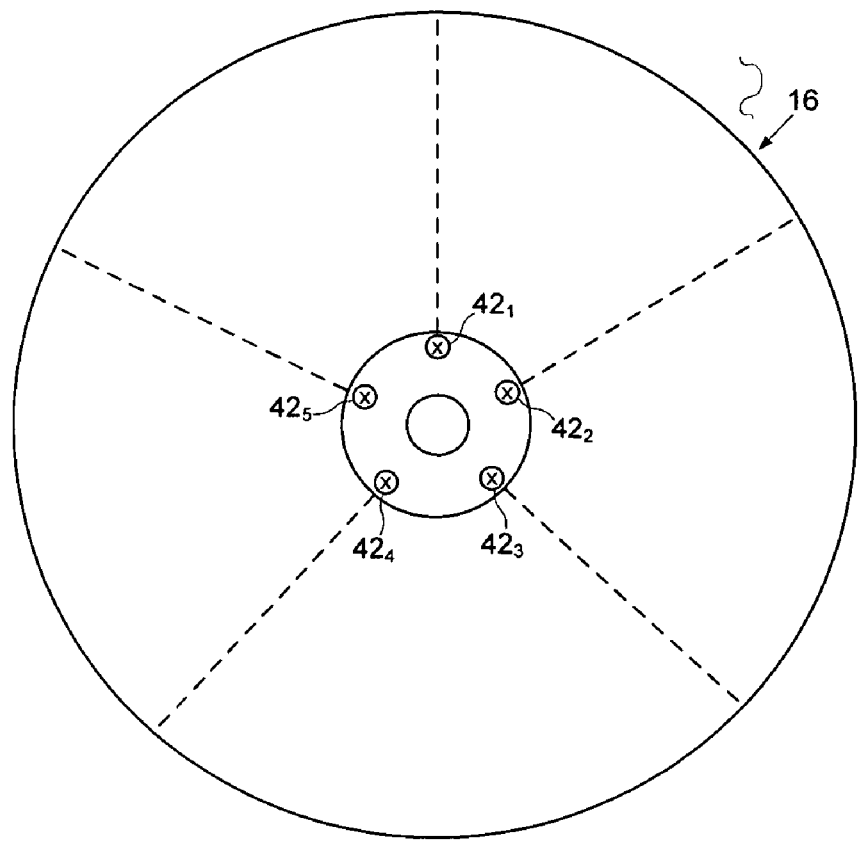
FIG. 3A shows an embodiment of the present invention wherein the disk is clamped to a spindle motor using a number of screws.

FIG. 3A shows an embodiment of the present invention wherein the disk 16 is clamped to a spindle motor with a number of screws (five screws $42_1$-$42_5$ in the example of FIG. 3A). Each screw 42 may cause a warping of the disk 16 such that the disk surface 16 comprises ridges extending from the inner diameter toward the outer diameter. This warping may result in a sinusoidal deviation in the fly height of the head as illustrated in the example in FIG. 3B, wherein the frequency of the sinusoid is based on the number screws as well as the rotation frequency of the disk. In one embodiment, the frequency component extracted from the fly height measurement for adjusting the DFH control setting comprises this sinusoidal disturbance, and in one embodiment, the DFH control setting is adjusted using feed forward compensation in order to follow this sinusoidal disturbance.

Figure 3B:
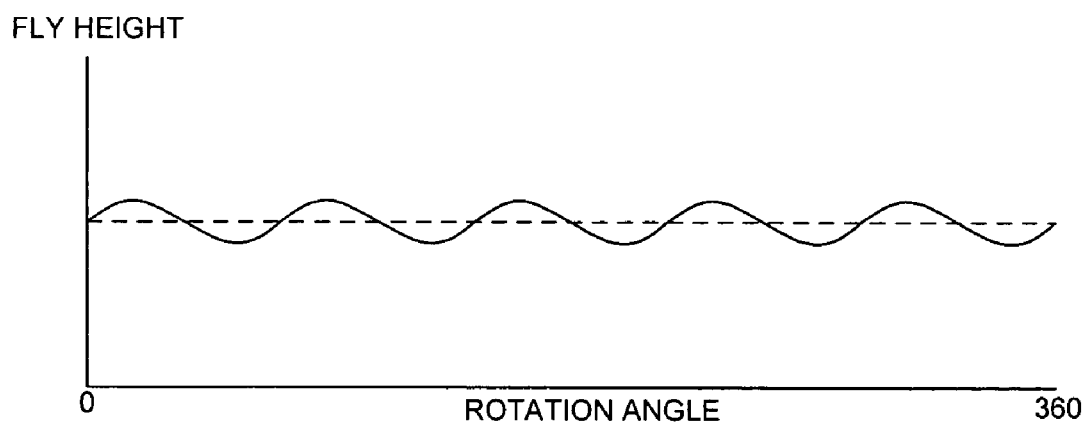
FIG. 3B shows an example deviation in the fly height due to the screws warping the disk surface.
Figure 4A:
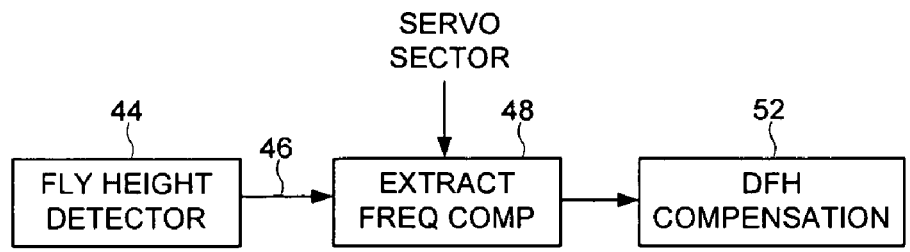
FIG. 4A shows control circuitry according to an embodiment of the present invention for extracting the frequency component from the fly height measurement signal.
Figure 4B:
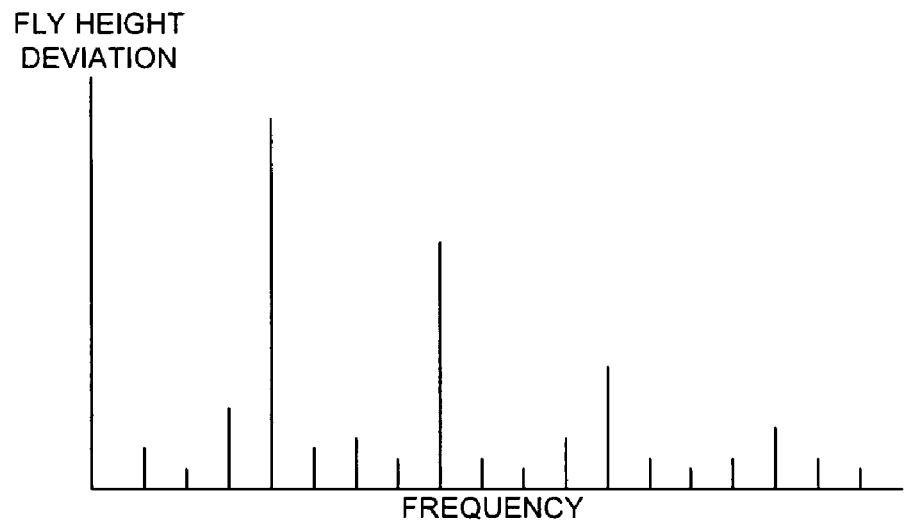
FIG. 4B shows an example spectrum of the fly height deviation, wherein a fundamental frequency component due to the disk warping is extracted and used for feed forward compensation.

The frequency component may be extracted from the fly height measurement in any suitable manner. FIG. 4A shows an embodiment wherein a suitable fly height detector 44 generates a fly height deviation signal 46, and as the head 18 passes over each servo sector $32_0$-$32_N$, suitable circuitry 48 extracts the frequency component from the fly height deviation signal 46. In one embodiment, the circuitry 48 generates a frequency spectrum of the fly height amplitude deviation as shown in the example in FIG. 4B (e.g., by computing a Discrete Time Fourier Transform (DTFT)) and extracts the frequency component having the highest amplitude. In one embodiment, the frequency component with the highest amplitude corresponds to the fundamental frequency of the sinusoidal disturbance caused by the screws $42_1$-$42_5$ of the disk clamp warping the disk as shown in FIGS. 3A and 3B. Compensating for the fundamental frequency of the sinusoidal disturbance typically also compensates for the harmonics of the fundamental frequency shown in FIG. 4B.

Figure 4C:
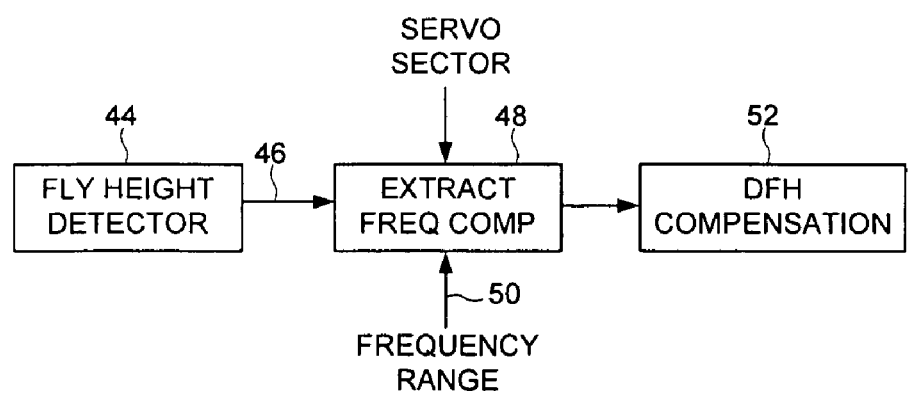
FIG. 4C shows control circuitry according to an embodiment of the present invention wherein a predetermined frequency range of the fly height measurement signal is evaluated to extract the frequency component.

In an alternative embodiment shown in FIG. 4C, the circuitry 48 is provided with a target frequency range 50 from which the amplitude of the fly height deviation signal 46 is extracted. In one embodiment, the frequency range 50 is based on the number of screws $42_1$-$42_5$ of the disk clamp as well as the rotation frequency of the disk. The amplitude of the fly height deviation signal 46 at the target frequency 50 may be extracted in any suitable manner, such as by computing a DTFT or with a suitable band pass filter.

In one embodiment, a DFH compensation value corresponding to the amplitude of the fly height deviation at the extracted frequency component is saved by suitable circuitry 52 for each servo sector $32_0$-$32_N$. As the head passes over each servo sector $32_0$-$32_N$, the DFH compensation value is used to adjust the DFH control setting 19 (FIG. 2A) during normal operation of the disk drive. In this manner, the servo sectors $32_0$-$32_N$ provide the necessary phase synchronization of the extracted frequency component with the rotation of the disk. Techniques other than processing the servo sectors $32_0$-$32_N$ may be employed to synchronize the extracted frequency component to the rotation of the disk, such as by using a suitable spindle motor signal.

Figure 5A:
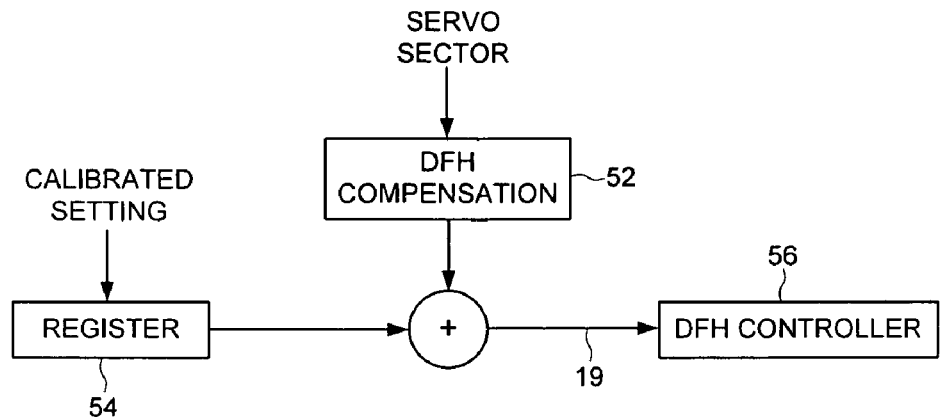
FIG. 5A shows control circuitry according to an embodiment of the present invention wherein a nominal DFH control setting is adjusted in response to the extracted frequency component.

The DFH compensation values 52 may be used to adjust the DFH control setting 19 in any suitable manner. In an embodiment shown in FIG. 5A, a nominal DFH control setting is calibrated and stored in register 54 which is then adjusted in response to the DFH compensation values 52 corresponding to the extracted frequency component. In the embodiment of FIG. 5A, the nominal DFH control setting 54 is adjusted with a DFH compensation value 52 at each servo sector. The adjusted DFH control setting 19 is applied to a suitable DFH controller 56, such as a heater or PZT actuator, so that the head follows the fly height deviations.

Figure 5B:
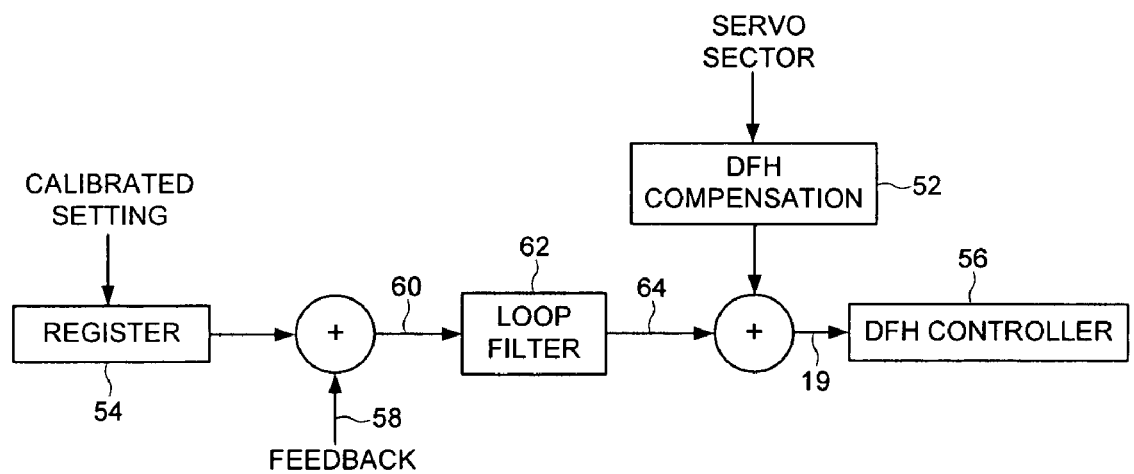
FIG. 5B shows control circuitry according to an embodiment of the present invention wherein the nominal DFH control setting is compared to a feedback signal to generate an error signal, the error signal is filtered to generate a control signal, and feed forward compensation is applied to the control signal in response to the frequency component.

FIG. 5B shows control circuitry according to an alternative embodiment of the present invention wherein the nominal DFH control setting 54 is compared to a feedback signal 58 to generate an error signal 60. The error signal 60 is filtered 62 to generate a control signal 64, and the DFH compensation values 52 are applied to the control signal 64 as feed forward compensation. In this embodiment, the feedback signal 58 compensates for non-repeatable fly height deviations, and the feed forward signal (DFH compensation values 52) compensates for the repeatable fly height deviations corresponding to the extracted frequency component.

Figure 6A:
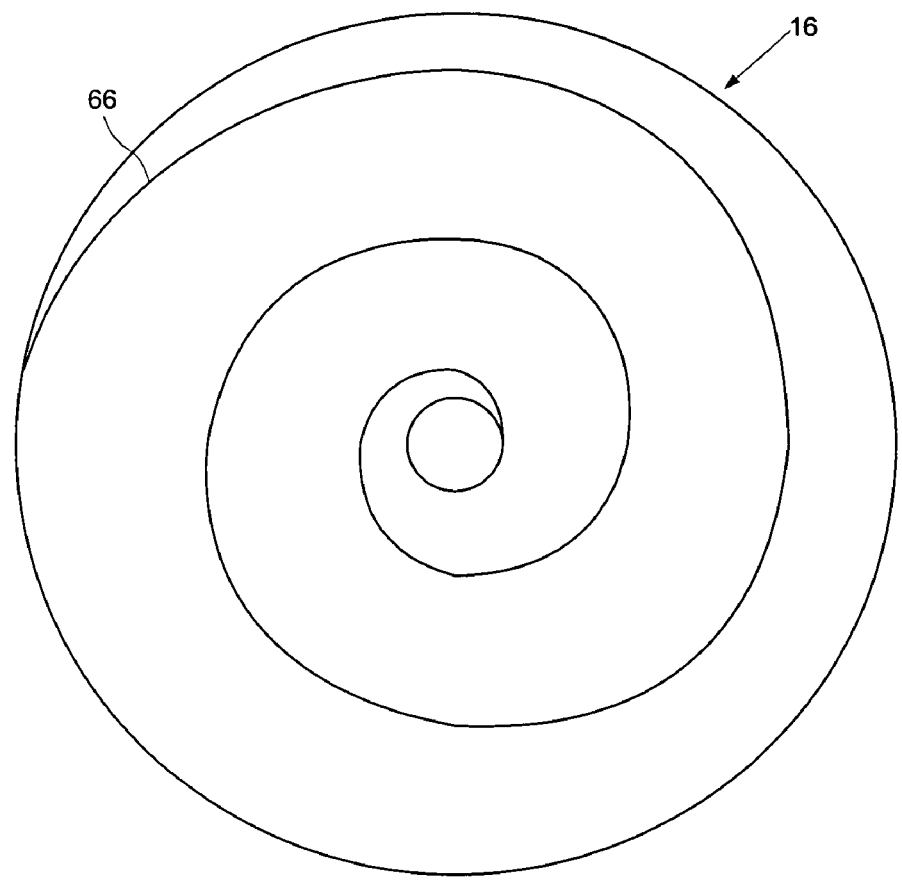
FIG. 6A shows an embodiment of the present invention wherein servo data recorded on the disk comprises a plurality of spiral tracks.
Figure 6B:
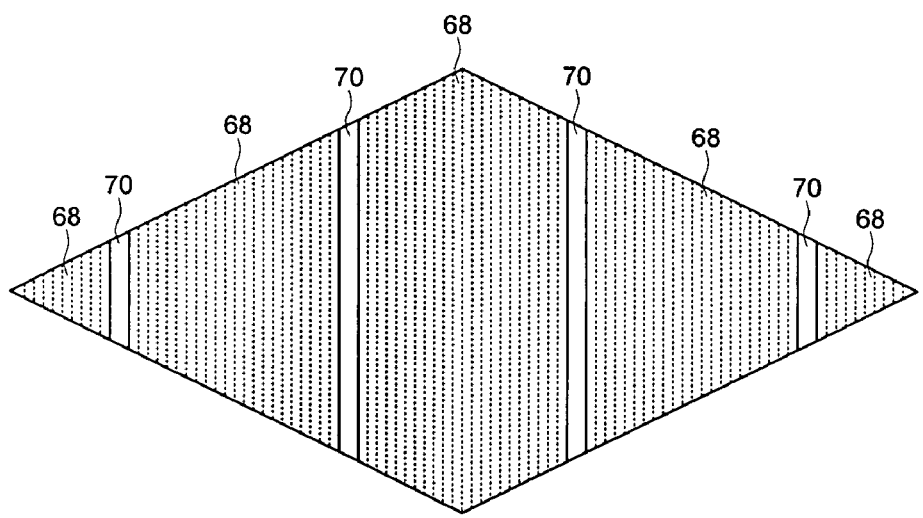
FIG. 6B illustrates the shape of the read signal as the head passes over a spiral track according to an embodiment of the present invention.

In one embodiment, servo data recorded on the disk for servoing the head comprises a plurality of spiral tracks, where each spiral track comprises a high frequency signal interrupted by a sync mark at a sync mark interval. Each spiral track may be written over a partial disk revolution, or over multiple disk revolutions. FIG. 6A shows an example spiral track 66 written over multiple disk revolutions, and FIG. 6B shows an example envelope of the read signal generated as the head 18 passes over a spiral track, including the high frequency signal 68 interrupted by a sync mark 70 at a sync mark interval.

In one embodiment, the spiral tracks 66 are used in place of the conventional concentric servo sectors $32_0$-$32_N$ shown in FIG. 2A. In an alternative embodiment, the spiral tracks 66 are used as seed patterns for servo writing the conventional concentric servo sectors $32_0$-$32_N$ during a fill operation. In both embodiments, the DFH compensation values 52 are learned during a calibration phase (e.g., over multiple disk revolutions), and then used to compensate the DFH control setting 19 prior to writing data to the disk or reading data from the disk, such as user data, spiral track data, or the conventional concentric servo sectors $32_0$-$32_N$. In one embodiment, the fly height measurement signal 46 is generated by evaluating the read signal when reading spiral tracks 66, and in another embodiment, the fly height measurement signal 46 is generated by evaluating the read signal when reading the conventional concentric servo sectors $32_0$-$32_N$. In yet another embodiment, the DFH compensation values 52 are learned during the calibration phase at a number of different radial locations, and in one embodiment, the DFH compensation values 52 are learned for every servo track.

Any suitable control circuitry 28 may be employed to implement the flow diagrams in the embodiments of the present invention, such as any suitable integrated circuit or circuits, which may include a microprocessor executing the steps of a control program. In the embodiment where the control circuitry 28 is implemented within a disk drive, it may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry 28 comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk 16 and read into a volatile semiconductor memory when the disk drive is powered on. In yet another embodiment, the control circuitry 28 comprises suitable logic circuitry, such as state machine circuitry.

What is claimed is:

1. A method of selecting a dynamic fly height (DFH) control setting for a head in a disk drive, the method comprising:
   servoing the head over a disk;
   generating a fly height measurement for the head;
   extracting a frequency component from the fly height measurement; and
   adjusting the DFH control setting for the head in response to the extracted frequency component.

2. The method as recited in claim 1, wherein:
   the disk is clamped to a spindle motor with a number of screws; and
   the frequency component is based on the number of screws.

3. The method as recited in claim 2, wherein the frequency component is based on the number of screws multiplied by the rotation frequency of the disk.

4. The method as recited in claim 1, wherein adjusting the DFH control setting comprises:
   calibrating a nominal DFH control setting; and
   adjusting the nominal DFH control setting in response to the extracted frequency component.

5. The method as recited in claim 4, wherein adjusting the DFH control setting further comprises:
   comparing the nominal DFH control setting to a feedback signal to generate an error signal;
   filtering the error signal to generate a control signal; and
   applying feed forward compensation to the control signal in response to the extracted frequency component.

6. The method as recited in claim 1, wherein:
   servo data is recorded on the disk;
   the servo data comprises a plurality of servo sectors; and
   a fly height measurement is generated as the head passes over each servo sector.

7. The method as recited in claim 6, wherein:
   the servo sectors are read to generate a read signal; and
   the fly height measurement is generated in response to the read signal.

8. The method as recited in claim 1, wherein extracting the frequency component from the fly height measurement comprises:
   evaluating an amplitude deviation of the fly height measurement over a range of frequencies; and
   selecting a frequency component having the maximum amplitude deviation.

9. The method as recited in claim 1, wherein extracting the frequency component from the fly height measurement comprises evaluating an amplitude deviation of the fly height measurement over a predetermined frequency range.

10. The method as recited in claim 9, wherein:
    the disk is clamped to a spindle motor with a number of screws; and
    the predetermined frequency range is based on the number of screws.

11. The method as recited in claim 1, wherein:
    servo data is recorded on the disk;
    the servo data comprises a plurality of spiral tracks; and
    a fly height measurement is generated as the head passes over each spiral track.

12. A disk drive comprising:
    a disk;
    a head actuated over the disk; and
    control circuitry operable to select a dynamic fly height (DFH) control setting for the head by:
      servoing the head over the disk;
      generating a fly height measurement for the head;
      extracting a frequency component from the fly height measurement; and
      adjusting the DFH control setting for the head in response to the extracted frequency component.

13. The disk drive as recited in claim 12, wherein:
    the disk is clamped to a spindle motor with a number of screws; and
    the frequency component is based on the number of screws.

14. The disk drive as recited in claim 13, wherein the frequency component is based on the number of screws multiplied by the rotation frequency of the disk.

15. The disk drive as recited in claim 12, wherein the control circuitry is further operable to adjust the DFH control setting by:
    calibrating a nominal DFH control setting; and
    adjusting the nominal DFH control setting in response to the extracted frequency component.

16. The disk drive as recited in claim 15, wherein the control circuitry is further operable to adjust the DFH control setting by:
    comparing the nominal DFH control setting to a feedback signal to generate an error signal;
    filtering the error signal to generate a control signal; and
    applying feed forward compensation to the control signal in response to the extracted frequency component.

17. The disk drive as recited in claim 12, wherein:
    servo data is recorded on the disk;
    the servo data comprises a plurality of servo sectors; and
    the control circuitry is further operable to generate a fly height measurement as the head passes over each servo sector.

18. The disk drive as recited in claim 17, wherein the control circuitry is further operable to:
    read the servo sectors to generate a read signal; and
    generate the fly height measurement in response to the read signal.

19. The disk drive as recited in claim 12, wherein the control circuitry is further operable to extract the frequency component from the fly height measurement by:
    evaluating an amplitude deviation of the fly height measurement over a range of frequencies; and
    selecting a frequency component having the maximum amplitude deviation.

20. The disk drive as recited in claim 12, wherein the control circuitry is further operable to extract the frequency component from the fly height measurement by evaluating an amplitude deviation of the fly height measurement over a predetermined frequency range.

21. The disk drive as recited in claim 20, wherein:
    the disk is clamped to a spindle motor with a number of screws; and
    the predetermined frequency range is based on the number of screws.

22. The disk drive as recited in claim 12, wherein:
    servo data is recorded on the disk;
    the servo data comprises a plurality of spiral tracks; and the control circuitry is further operable to generate a fly height measurement as the head passes over each spiral track.

23. A disk drive comprising:
a disk;
a head actuated over the disk; and
a means for servoing the head over the disk;
a means for generating a fly height measurement for the head;
a means for extracting a frequency component from the fly height measurement; and
a means for adjusting a DFH control setting for the head in response to the extracted frequency component.

* * * * *